UNITED STATES PATENT OFFICE.

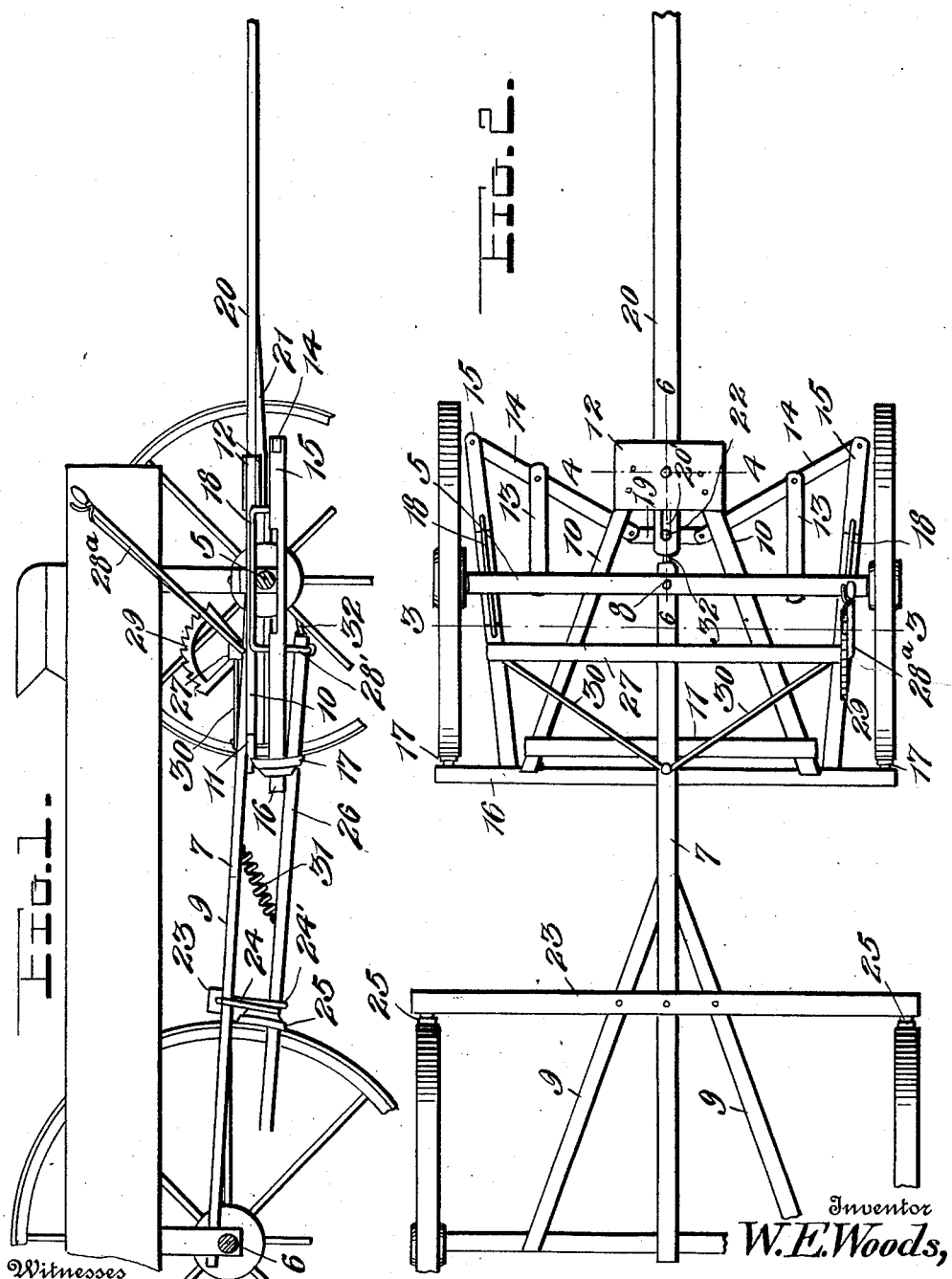

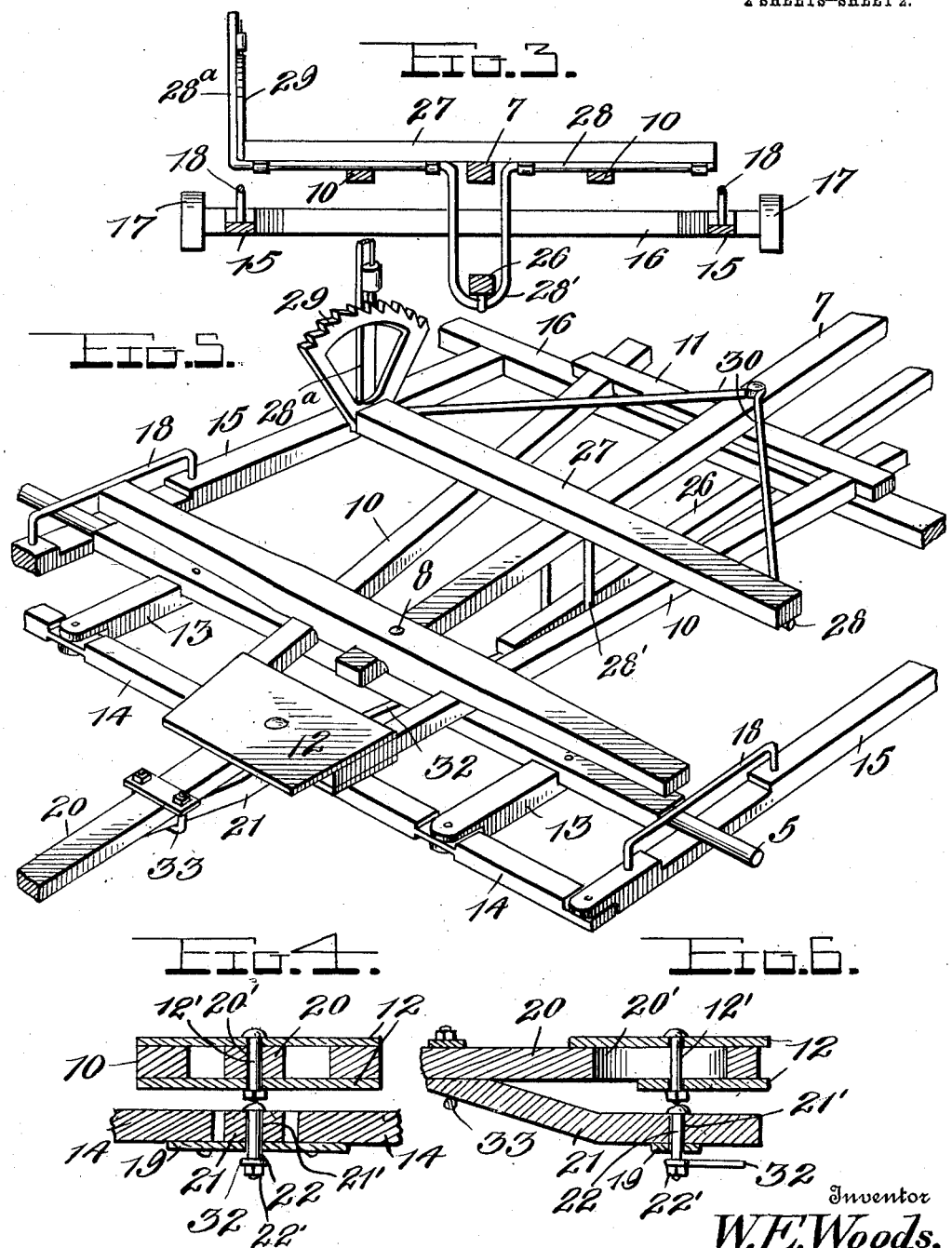

WILLIAM E. WOODS, OF GRIFFIN, INDIANA.

VEHICLE-BRAKE.

1,003,569.   Specification of Letters Patent.   Patented Sept. 19, 1911.

Application filed November 21, 1910. Serial No. 593,508.

*To all whom it may concern:*

Be it known that I, WILLIAM E. WOODS, a citizen of the United States, residing at Griffin, in the county of Posey and State of Indiana, have invented certain new and useful Improvements in Vehicle-Brakes, of which the following is a specification, reference being had to the accompanying drawings.

This invention relates to improvements in wagon brakes of that character shown and described in my prior Patents Numbers 913,342 and 954,238.

The present invention has for its primary object to simplify and generally improve the construction of the brakes disclosed in the above mentioned patents whereby the brake shoes are automatically applied to the wheels of the vehicle by backward movement of the animals when descending an incline.

A further object of the invention resides in the provision of a novel arrangement of parts whereby the brakes may be simultaneously applied to both the front and rear wheels of the vehicle, or only the front wheels so applied, manually actuated means being provided for applying the rear brakes.

A still further object of the invention resides in the provision of a reversible element arranged upon the tongue of the vehicle whereby the front brakes may be rendered inoperative.

With the above and other objects in view, the invention consists of the novel features of construction, combination and arrangement of parts hereinafter fully described and claimed, and illustrated in the accompanying drawings, in which—

Figure 1 is a side elevation of my improved wagon brake; Fig. 2 is a top plan view thereof; Fig. 3 is a section taken on the line 3—3 of Fig. 2; Fig. 4 is a section taken on the line 4—4 of Fig. 2; Fig. 5 is a detail perspective view of the front brake and coöperating parts removed; and Fig. 6 is a section taken on the line 6—6 of Fig. 2.

Referring in detail to the drawings 5 and 6 designate the front and rear supporting axles respectively which may be of any usual or preferred construction.

7 indicates the reach bar which is longitudinally disposed beneath the body of the vehicle and is connected to said front and rear axles, the front end of said reach bar being pivotally arranged between the sand board and the body of the front axle by means of the king bolt 8. The rear end of the reach bar is rigidly secured to the rear vehicle axle and the rear hounds 9 connected to the intermediate portion of the reach bar and to the ends of said axle. The front hounds 10 extend between the sand board and the body of the front axle 5 and diverge rearwardly, the rear ends of said hounds being connected by a cross bar 11. Plates 12 are arranged upon opposite sides of the front ends of the hounds 10 and are rigidly secured thereto.

Forwardly extending arms 13 are rigidly secured to the bottom of the axle 5, and the forward ends of said arms are bifurcated to receive the bars 14 which are pivoted in the arms intermediate of their ends. The outer ends of the bars 14 are pivotally connected to the forward ends of the longitudinally disposed inwardly extending bars 15, the rear ends of which are secured to opposite ends of the brake beam 16. This brake beam carries the shoes 17 to frictionally engage with the wheel tires. The bars 15 are provided with longitudinal recesses in their upper surfaces to accommodate the front axle 5 and guide rods 18 have their ends secured in the bars 15 and are disposed between the axle and its sand bar. The inner ends of the transversely disposed pivotally mounted bars 14 are loosely connected together by means of a plate 19. A tongue 20 is adapted to be received between the plates 12 which connect the forward ends of the hounds 10. The end of the tongue is longitudinally slotted as shown at 20′ and to one side thereof a bar 21 is secured at one of its ends, said bar extending at its other end in spaced relation to the tongue. This bar is provided with a pin receiving opening 21′ to receive a pin 22 which is adapted to be inserted through an opening in the connecting plate 19 between the ends of the arms 14. A bolt 12′ is removably disposed through the spaced plates 12 and extends through the slot 20′ of the tongue 20. When the tongue 20 is thus connected it will be obvious that in the rearward movement of the tongue between the spaced plates 12, the inner ends of the bars 14 which are connected to the member 21 carried by the tongue will be forced rearwardly, the outer ends of said bars moving forwardly and drawing upon the longitudinal bars 15, thereby moving the brake beam 16 forwardly and engaging the brake shoes with the front wheels of the vehicle.

In order to simultaneously apply the brakes to the rear wheels of the vehicle, the rear transverse brake beam 23 is secured upon the reach bar and the rear hounds 9. Upon the under side of this brake beam a rock shaft 24 is mounted in suitable bearings and has its ends bent downwardly, to which are fixed the brake shoes 25. The intermediate portion of the rock shaft is disposed downwardly in substantially U-shaped form beneath the reach bar as shown at 24' and is connected to the rear end of an operating member 26. A bar 27 is also mounted upon the forward end portion of the reach bar in rear of the front axle and has mounted on its under side a rock shaft 28, the central portion of which is bent downwardly into substantially U-shaped form as at 28'. One end of this shaft is vertically extended to provide an operating lever 28ª which carries a suitable spring controlled dog for engagement with the teeth of a rack 29 suitably mounted on the end of the bar. The bar 27 is braced by means of the rods 30 which connect the ends thereof with the reach bar. The forward end of the operating member 26 is loosely connected to the intermediate portion of the rock shaft 28 whereby upon the actuation of the operating lever, it will be obvious that the member 26 may be moved rearwardly to rock the shaft 24 and engage the brake shoes with the rear vehicle wheel. A spring 31 is secured to the reach bar and to the operating member 26 to normally force said operating member forwardly and hold the rear brake shoes 25 out of frictional contact with the wheels. A rod 32 connects the forward end of the operating member 26 with the pin 22 which extends through the member 21 carried by the tongue 20, said rod being secured on the pin by means of the nut 22'. It will thus be obvious that both brakes may be automatically applied by the rearward movement of the tongue due to the backing up of the animals in descending a hill, such backward movement of the tongue also forcing the member 26 rearwardly and applying the rear brakes, the front brakes being applied as previously described. When, however, it is desired to throw the forward brakes out of operation, the position of the element 21 upon the tongue is reversed by removing the clip 33 which secures the same to said tongue, and disconnecting the same from the plate 19 by removing the pin 22. After placing the element 21 on the opposite or upper side of the tongue and securing the same in position, the tongue will be positioned beneath the plates 12 and the element 21 between said plates. It will thus be seen that when the pin 12' is inserted through the openings in the plates 12 and the element 21, there will be no longitudinal movement of the tongue so that the forward brakes will remain in their inoperative positions. The rear brakes, however, can be at any time applied by means of the lever 28ª which may be adjusted to apply the rear brakes and securely hold them in such position so as to relieve the animals when descending a steep incline.

From the foregoing it is thought that the construction and operation of my improved brake will be clearly understood.

It will be observed that I have materially simplified and improved its construction over my prior devices for accomplishing similar ends.

The brake is very reliable and efficient in practical operation and may be easily and quickly applied by the operator from his seat upon the vehicle when actuated by hand. When the vehicle is descending a hill, the weight of the load contained therein continually acts to force the brake shoes into close frictional engagement with the wheel tires as long as the vehicle is on the incline so that the animals may be easily stopped and permitted to rest.

The device is comparatively simple in construction and owing to the fact that but few elements are employed, it will be obvious that it is also extremely durable and may be produced at a nominal expense.

While I have above described the preferred construction and arrangement of the various parts, it will be understood that the device is susceptible of considerable modification without departing from the essential feature or sacrificing any of the advantages thereof.

Having thus described the invention what is claimed is:—

1. In a vehicle brake, the combination with a running gear including the forward hounds, of spaced plates secured to the forward ends of the hounds, a longitudinally movable frame arranged beneath said hounds, said frame including a transverse brake beam carrying brake shoes for engagement with the front vehicle wheels and said bars extending forwardly of the vehicle axle, forwardly extending arms fixed to the vehicle axle, transverse bars pivoted intermediate of their ends upon said arms and having their outer ends pivotally connected to the side bars of said frame, a tongue longitudinally slidable between the spaced plates on the front ends of the hounds, a bar removably secured to said tongue and arranged beneath the same in spaced relation thereto, means secured to said bar and pivotally connected to the inner ends of said pivoted bars, rear brake mechanism including an operating bar, a rod connecting said operating bar to the bar arranged beneath said tongue whereby the front and rear brake shoes are simultaneously applied in the sliding movement of the tongue in one direction, means for rigidly securing the bar carried by the tongue upon the upper side of said tongue and between the spaced plates on said hounds to prevent movement of the front brake beam, and additional means for manually actuating the rear brake mechanism.

2. In a vehicle brake, the combination with a running gear including the forward hounds, of a longitudinally slidable frame including a transverse brake beam having brake shoes arranged thereon for engagement with the front vehicle wheels and longitudinal side bars extending in advance of the vehicle axle, spaced plates connecting the hounds at their forward ends, a tongue arranged between said plates and having a longitudinal slot therein, a bolt disposed through said plates and through said slot to limit the sliding movement of the tongue, a longitudinal bar removably secured to said tongue and disposed in spaced relation thereto, means connecting said bar and the side bars of said slidable frame to slide said frame and apply the brake shoes to the front vehicle wheels, and rear brake mechanism including a longitudinal operating bar, a rod connecting said bar and said connecting means between the tongue and the side bars of said frame, said bar which is secured to said tongue being adapted to be arranged upon the upper side thereof and disposed between the spaced plates and rigidly held therein by the bolt extending through said plates whereby said frame is held against sliding movement, and manually operable means for independently actuating the rear brake mechanism.

In testimony whereof I hereunto affix my signature in the presence of two witnesses.

WILLIAM E. WOODS.

Witnesses:
 ELEBA JORDON,
 ELISHA E. ELLIS.

---

Copies of this patent may be obtained for five cents each, by addressing the "Commissioner of Patents, Washington, D. C."